UNITED STATES PATENT OFFICE.

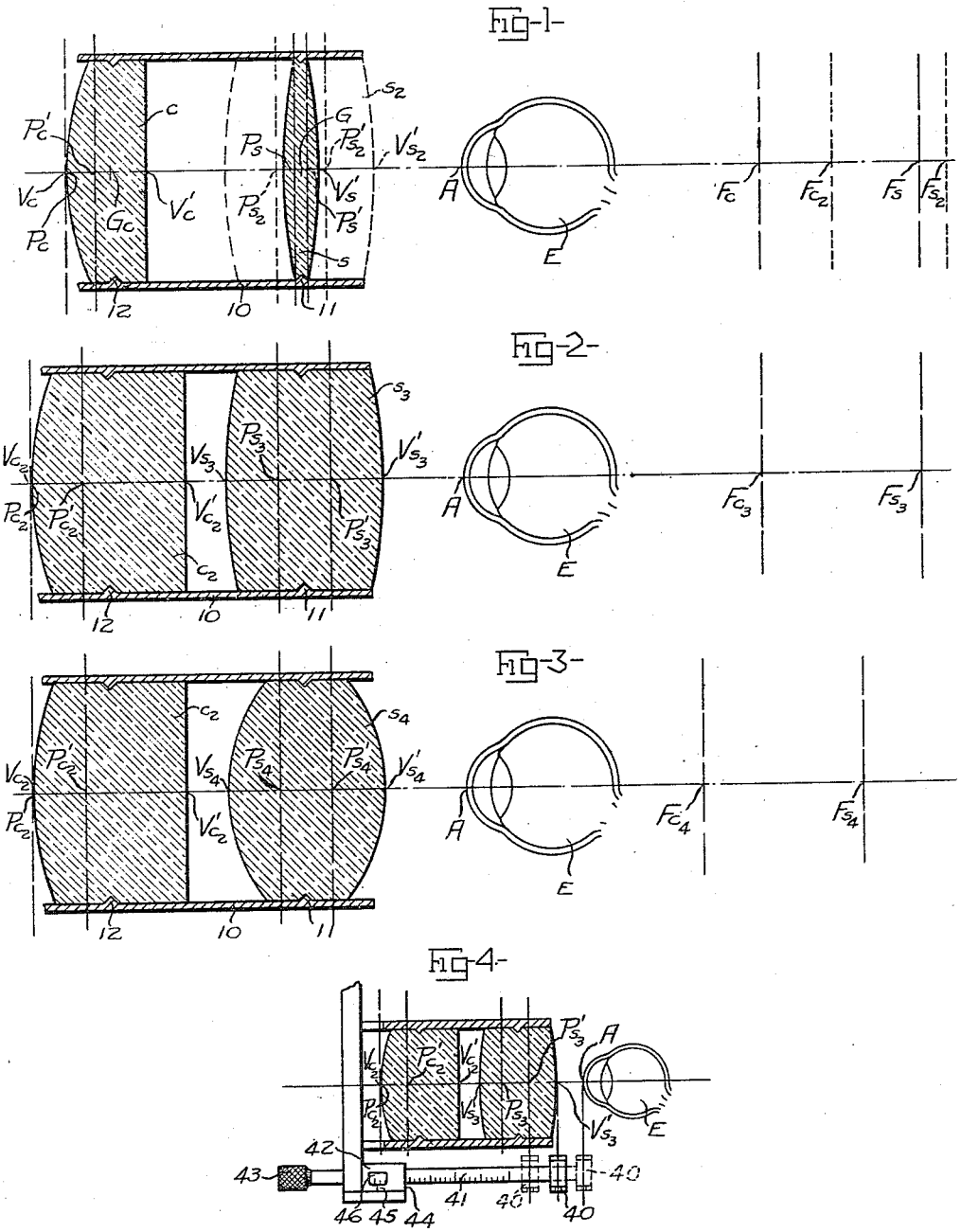

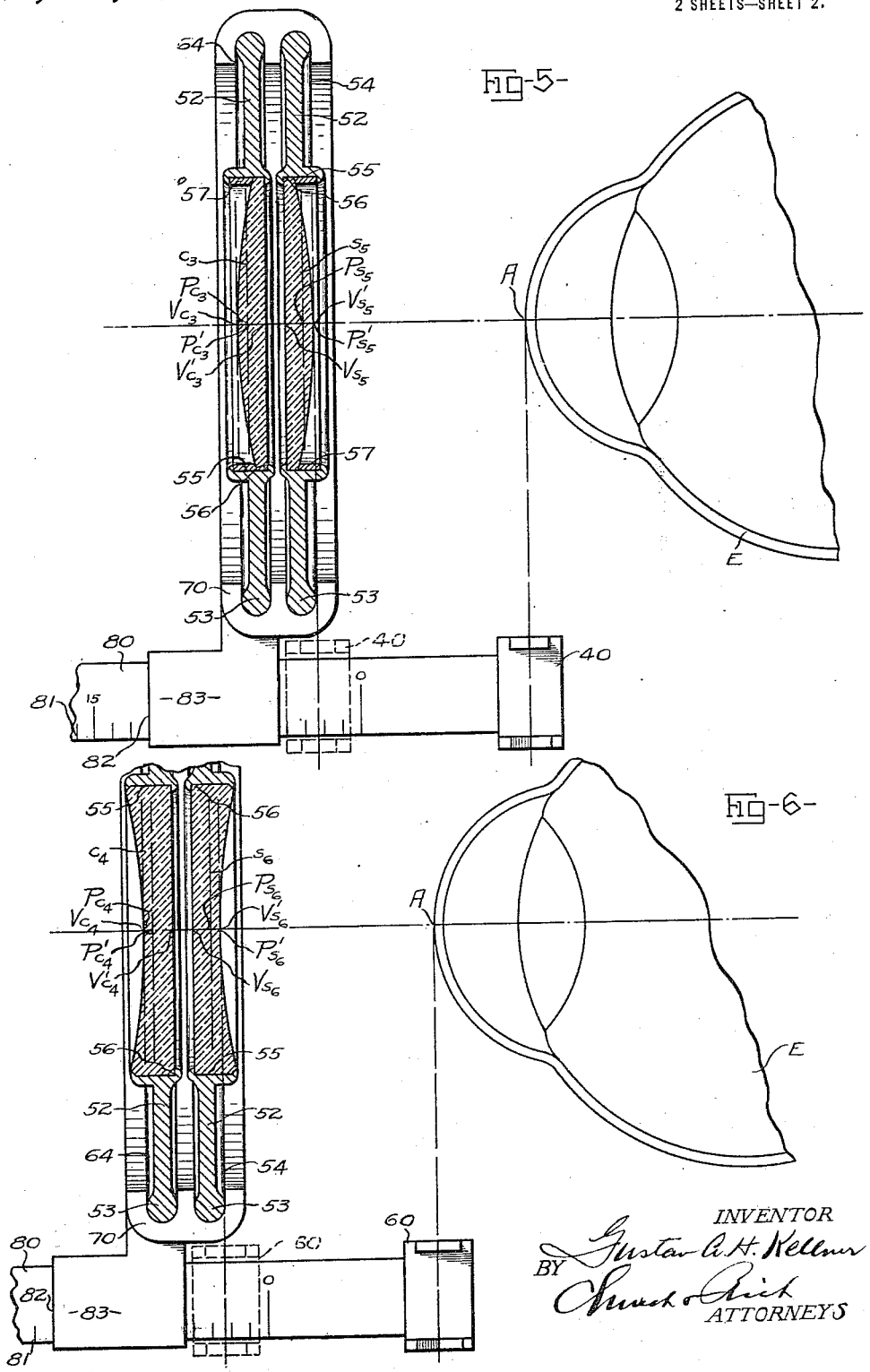

GUSTAV A. H. KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC TEST-LENS SET.

1,265,671.  Specification of Letters Patent.  Patented May 7, 1918.

Application filed October 9, 1916. Serial No. 124,492.

*To all whom it may concern:*

Be it known that I, GUSTAV A. H. KELLNER, a citizen of the United States, residing at Rochester, in the county of Monroe, State of New York, have invented certain new and useful Improvements in Ophthalmic Test-Lens Sets; and I do declare the following to be a full, clear, and exact description of the same, reference being had to the accompanying drawings, forming a part of this specification, and to the characters of reference marked thereon.

My invention relates to optical instruments and more particularly relates to optometrical apparatus known as ophthalmic test or trial lens sets which comprise a variety of lenses each possessing different refractive qualities.

An object of the present invention is to provide a test lens set the individual lenses of which are so constructed and the elements of each of the lenses of which are so coördinated that the test set is simpler and more convenient in use and will yield more accurate and more complete data for the making and fitting of opthalmic lenses, than trial lens sets heretofore known. A further object is to provide a set of coördinated test lenses mounted in a novel manner, that is adapted to be manufactured accurately and economically and that is precise and convenient in use.

In the drawings: Figure 1 is a schematic diagram illustrating the effect of lack of coördination of the elements of the different lenses forming an ordinary trial lens set; Figs. 2 and 3 are schematic diagrams illustrating a test lens set made in accordance with my invention; Fig. 4 is a schematic diagram on a smaller scale than the preceding figures, of a pair of test lenses made in accordance with my invention and held before the eye of a patient in a support embodying a gage for measuring the distance from the apex of the cornea of the eye to the adjacent vertex or principal point of the lens nearest the eye; Figs. 5 and 6 each illustrate on an enlarged scale, two lenses of a test lens set comprising a practical embodiment of my invention, arranged before the eye of a patient.

Throughout the several figures of the drawings, the letter "$s$" either alone or with suitable sub-numerals has been used to denote spherical lenses, the letter "$c$", either alone or with suitable sub-numerals, has been used to denote cylinder lenses, the letters "P" and "P'", in combination with the reference characters of the respective lenses as sub-numerals, denote the two principal points in each of the lenses, and the letters "V" and "V'", in combination with the reference characters of the respective lenses as sub-numerals, denote the two vertices of each of the lenses.

In ordinary ophthalmic trial lens sets the center thickness of the individual lenses of the set, that is, the distance from pole to pole of a lens along its optical axis, differs considerably in the various lenses of different powers in the set. Thus in the same set while the center thickness of each of the various negative lenses of different powers will vary only a little, the center thickness of the plus lenses will vary a great deal, for example, a plus 1 diopter spherical lens will probably have a center thickness of 1.8 mm., a plus 10 diopter lens, a center thickness of 4.1 mm. and the center thickness of a plus 20 diopter lens will probably be 8.8 mm.

The result of this difference in center thickness in the various lenses of a set is illustrated in Fig. 1 wherein I have represented an ordinary 1 diopter sphero trial lens $s$ placed in position before the eye E, and in the same relative position thereto, I have shown in dotted lines, a lens $s_2$ having approximately the center thickness of an ordinary plus 20 diopter trial lens; but I have, in order to render the illustration more simple and clear, provided the lens $s_2$ with a pair of curves that will give it the same power as the lens $s$ whereby the equivalent focal length of the two lenses $s$ and $s_2$ will be the same. I have also represented an ordinary 4 diopter cylinder trial lens arranged in position before the eye E in combination with either of the lenses $s$ or $s_2$. Throughout Figs. 1 to 4 of the drawings, the representations being purely schematic, I have for the sake of simplicity and clearness, diagrammatically shown the lenses as held in a support 10 by providing each of them with a peripheral groove arranged in a plane passing through the geometrical center of the lens at right angles to the axis thereof with which groove the inwardly projecting ribs 11 and 12 are adapted to coöperate, the former with the sphero lenses and the latter with the cylinder lenses.

It will be observed on referring to Fig. 1, that the principal point $P's$ of the lens $s$ lies farther from the apex A of the cornea than the principal point $P's_2$ of the lens $s_2$, presuming that the axial distance of the ribs 11 on the support 10 from the apex A of the cornea has not been changed. This condition exists regardless of the power of the curves of the lens $s_2$.

Recent investigation in the field of ophthalmology and optometry has emphasized the importance of properly locating the spectacle lens in front of a patient's eye and unless the different locations of the principal points $P's$ and $P's_2$ occurring in actual use in the stronger and weaker lenses respectively, due to their variation in center thickness, be compensated for, erroneous correction of the patient's eyes will result, because the focal point $Fs_2$ of the thicker lens $s_2$ falls farther away from the apex A of the cornea than the focal point $Fs$ of the thinner lens. This error in the actual correction will increase irregularly with the power of the lens employed since the center thickness of the lenses increases with their power and if the lenses be adjusted to provide a uniform corneal distance, that is, the distance $A-V's_2$, the error will be greater still because the difference between the position of the principal points $P's$ and $P's_2$ with relation to the geometrical center G of the respective lenses $s$ and $s_2$ is not as great as the difference between the location of the same principal points $P's$ and $P's_2$ with relation to the adjacent vertex $V's$ or $V's_2$ of their respective lenses $s$ and $s_2$, that is to say, that the distance $G-P's$ is not as great as the distance $V's-P's$ and $G-P's_2$ is not as great as $V's_2-P's_2$.

Difference in the center thickness of the sphero trial lenses also affects the cylinder addition produced by a cylinder trial lens. Thus when a cylinder trial lens such as $c$ is placed in combination with a sphero trial lens having a center thickness such as the lens $s_2$, the cylinder power added as represented by the distance between the astigmatic focal point $Fc_2$ and the focal point $Fs_2$ is less than the cylinder addition produced by the same cylinder trial lens $c$ when it is placed in combination with a sphero lens such as $s$, the cylinder power added in the latter case being represented by the distance between the astigmatic focal point $Fc$ and the focal point $Fs$. This difference in the cylinder power produced by the same cylinder trial lens when in combination at one time with a lens such as $s_2$ and at another time with a lens such as $s$ is due to the difference in the distance from the principal point $P'c$ to the principal point $Ps_2$ when in combination with the lens $s_2$ and the distance between the same principal point $P'c$ and the principal point $Ps$ when the lens $c$ is in combination with the lens $s$.

It can be clearly understood now, that differences in the center thicknesses of the various cylinder trial lenses of a set (which center thicknesses differ in the cylinder trial lenses similarly to the manner in which they differ in the case of the sphero trial lenses) adds still another complication which is met when the lenses of an ordinary trial lens set are placed in combination. This difference also manifests itself when the cylinder lenses are used alone before the eye E because, with each different center thickness, the location of the principal point $P'c$ will vary relatively to the vertex $Vc$ and with relation to the geometrical center $Gc$.

The above described variations in the relation of the principal points in the various lenses of a set of ordinary trial lenses also makes it very difficult to determine the location of the principal points $P's$, $P's_2$ and $P'c$ either relatively to the apex A of the cornea or relatively to the far point of the eye E.

A test lens set may be made in accordance with my invention by constructing the lenses of the set as illustrated in Figs. 2 and 3. In such a set of test lenses each of the spherical lenses of the set, such as $s_3$ and $s_4$ will be made of the same form, with the same center thickness $V's_3-Vs_3$, $V's_4-Vs_4$ and of glass having the same refractive index, and, in computing the curves or refractive surfaces of each of the lenses, the constant center thickness is taken into consideration in order that the focal lengths, such as $P's_3-Fs_3$, $P's_4-Fs_4$, of all of the lenses may exactly agree with the nominal power of the lens, whether the lens be plus or minus, of low power or of high power. Likewise, the cylinder lenses such as $c_2$ of the set are all made of the same form, with the same center thickness $V'c_2-Vc_2$ and of glass having the same refractive index, and in computing the curvature or refractive surface of each of the lenses the constant center thickness of the lenses is taken into consideration.

In addition to this the refractive surface of each of the cylinder lenses for every different power is so computed that any cylinder lens of the set of any given power will produce exactly the same refractive effect on the eye as though a cylinder lens of that actual power were placed in the receptacle for spherical lenses with its principal point $P'c_2$ occupying the position of the principal point $P's_3$ of the sphero lens. Thus presuming the lens $c_2$ to be marked as a 4 diopter cylinder lens the refractive effect of this lens would be identical with the refractive effect of a 4 diopter cylinder lens arranged with its principal point $P'c_2$ coincident with the proper location of the principal point $P's_3$ of the sphero lens $s_3$.

The result of this is that when an ophthalmic lens is made and the sphero curves and the cylinder curves are combined in one lens, and this lens is arranged at the proper distance in front of the patient's eye; its effect on the eye will be identical with the effect produced by the combination of the sphero and cylinder test lenses by means of which the eye was corrected when tested.

Another result is that when a cylinder correction alone is required and the correction is obtained by placing the cylinder test lens in its usual receptacle before the eye being examined, an ophthalmic lens made from the data thus obtained by the use of the cylinder test lens, will give exactly the same correction as was produced by the cylinder test lens.

Since all of the sphero lenses of the set are made of the same form, have the same center thickness and are made of the same glass, the distances $V's_3$—$P's_3$, $P's_3$—$Ps_3$, $Ps_3$—$Vs_3$ in all of the sphero lenses throughout the sphero lenses of the set will respectively, be the same. Thus, in the illustration given in Figs. 2 and 3, $s_3$ represents a plus 1 diopter sphero lens, and $s_4$ a plus 20 diopter sphero lens, however, the distances $V's_3$—$P's_3$, $P's_3$—$Ps_3$, $Ps_3$—$Vs_3$ are each respectively equal to the distances $V's_4$—$P's_4$, $P's_4$—$Ps_4$, $Ps_4$—$Vs_4$. The sphero lenses of the set illustrated in Figs. 2, 3, and 4 are all shown to be double curved lenses and thus all of the sphero lenses of this set will either be double convex or double concave. The condition regarding the uniform location of each of the principal points in all of the lenses of the set with respect to their vertices will maintain, however, no matter what form of lens is used in constructing the sphero lenses of the test lens set, provided that they agree with the above requirements, namely, that all be alike in form, the same in center thickness and made of glass having the same refractive index.

Since all of the sphero lenses of the set are adapted to be located in the support 10 in the same relation therewith, as is represented in the drawings by the ribs 11 coöperating with a centrally arranged peripheral groove in all of the lenses as hereinabove explained, it is clear that if the support 10 be adjusted to arrange one of the lenses of the set, say $s_3$, with its vertex at a given distance from the apex A of the cornea of the eye, any other lens of the set such as $s_4$ substituted in the support 10 in place of the lens $s_3$ will occupy the same position and its various elements such as the vertex $V's_4$, the principal points $P's_4$ and $Ps_4$ will occupy the same position relatively to the eye as the corresponding points of the preceding lens.

It has been stated that each of the cylinder lenses of a test lens set made in accordance with my invention is made of the same center thickness and of the same glass, and that all of the cylinder lenses of the set are adapted to be held in uniform relation to their support as represented by the coöperation of the ribs 12 with the centrally arranged peripheral grooves in the lenses. The cylinder lenses are preferably made of the same form, each of them being plano convex or plano concave across the cylinder.

Thus in the case of the cylinder lenses also, the distances $V'c_2$—$P'c_2$, $P'c_2$—$Vc_2$ will throughout the cylinder lenses of the set, be respectively, the same.

Since the points $V's_3$, $P's_3$, $Ps_3$, and $Vs_3$ in each of the sphero lenses of the set will occupy the same position relatively to the elements 11 when it is placed in the support 10 and since the points $P'c_2$, $V'c_2$ and $Vc_2$ of each of the cylinder lenses of the set will occupy the same position relatively to the elements 12 when it is placed in the support 10, it will be seen that, providing the distance between the elements 11 and 12 remains unchanged the distances $Ps_3$—$P'c_2$ between the adjacent principal points of the sphero and cylinder lenses when placed in combination will be the same with any combination of sphero and cylinder lenses in the set, and thus, when the cylinder lens $c_2$ is placed in combination with the sphero lens $s_3$ the cylinder power added as represented by the distance $Fs_3$—$Fc_3$ is the same as when the same cylinder lens $c_2$ is placed in combination with another sphero lens $s_4$, the cylinder power added in this case being represented by the distance $Fs_4$—$Fc_4$.

With a test lens set made in accordance with my invention it is conveniently possible to measure the distance from the apex of the cornea of the eye under examination, not only to the adjacent vertex of the sphero lens or of the cylinder lens but also from the cornea to any of the principal points of the lenses. Since in practical use in my improved test lens set it is only necessary to know the location of the adjacent principal point of the lens such as $P's_3$ or $P's_4$ of the sphero lenses placed immediately before the eye, because the cylinder lenses project, as it were, a hypothetical working principal point into the plane of the rearmost principal points such as $P's_3$ or $P's_4$ of the spherical lenses: I will describe only the manner and means by which the distance from the apex of the cornea either to the adjacent vertex or to the adjacent principal point of the spherical lens placed before the eye under examination.

To this end, I provide on the support 10, a gage comprising a sight bar 40 secured to one end of the scale bar 41 which is slidably mounted in the support at 42 and I provide a convenient means such as the handle 43 for shifting the scale 41 longitudinally. The scale may either be provided with two sets of graduations one offset with relation to the other for a distance equal to the distance from the rear vertex to the rearmost principal point as $V's_3 - P's_3$, in the lens $s_3$, or a single scale may be used having two indices separated by this same distance. In Fig. 4, I have shown the latter method, the edge 44 forming an index coöperating with the scale when it is desired to read the distance from the apex A of the cornea to the adjacent vertex $V's_3$ of the spherical lens placed before the eye, and the index 45 on the side of the window 46 is used when it is desired to measure the distance from the apex A of the cornea of the eye to the adjacent principal point $P's_3$ of the test lens before the eye of the patient. The graduations of the scale are so arranged that the index 45 will coöperate with the zero mark on the scale when the sighting points on the sight bar 40 are alined as shown in Fig. 4 with the principal point $P's_3$, this being the extreme left hand position in which the sight bar is shown in dotted lines. The indexing edge 44 will then coöperate with the zero point when the sighting points on the sight bar 40 are alined with the vertex $V's_3$ as shown in Fig. 4, the sight bar being then in the position in which it is shown in full lines. When the sight bar is moved into the position with the sighting points in alinement with the apex A of the cornea, in which position the sighting bar is shown in dotted lines in the extreme right hand position, inspection of the scale with relation to the indexing edge 44 will give the corneal distance $A - V's_3$ and inspection of the scale with relation to the index 45 will give the distance from the apex A of the cornea to the principal point $P's_3$.

Essentially it is necessary in carrying out the present invention that the critical points of all of the lenses of a set, that is, the principal points, vertices and support engaging means and of course those portions of the support which engage with the lenses to locate them before the eyes of a patient, be so coördinated and adaptable that when the lenses are selectively arranged in position before an eye of a patient, the same vertex and the same principal point of each of the lenses may occupy the same position relatively to each other and relatively to the eye. However, for practical reasons it is preferable that those portions of the support operating to locate the lens be, to as great an extent as is possible fixed relatively to each other, and relatively to the support, and it is preferable that the coördination of the support engaging means, the vertices and principal points of the lenses be effected by a method permitting the most uniform standardization throughout each outfit although other systems of coördination may be employed at the expense of simplicity and commercial practicability. Accordingly this description of the invention is limited to such embodiments wherein the center thickness of each of the spherical lenses of the set and the refractive index of the glass from which each of them is made must be the same and wherein the center thickness of each of the cylinder lenses and the refractive index of the glass from which each of these lenses is made must be the same. Obviously it is not essential that the common center thickness of the spherical lenses be equal to the common center thickness of the cylinder lenses, nor is it essential that the set of spherical lenses and the set of cylinder lenses be both made of glass having the same refractive index, although usually for the sake of uniform standardization it is preferred to make the center thickness of the spherical and cylinder lenses the same and to make all of the lenses of glass having the same refractive index.

When constructed for practical use a test lens set made in accordance with my invention and heretofore explained theoretically in connection with Figs. 2 and 3 is preferably constructed as shown in Figs. 5 and 6 all of the sphero lenses such as $s_5$ and $s_6$ and all of the cylinder lenses such as $c_3$ and $c_4$ are made either plano convex or plano concave of the same center thickness and of glass of the same refractive index, the constant center thickness of all of the sphero lenses being taken into consideration as in the case of the lenses $s_3$ and $s_4$ in computing their curvature, and the curvature of the cylinder lenses being so computed relatively to the nominal designation of each lens, that when a cylinder lens is in position before the eye, its rearmost principal point such as $P'c_3$ or $P'c_4$ may be presumed virtually to lie in the plane of the rearmost principal point such as $P's_5$ or $P's_6$ of a sphero lens placed in position before the eye, as explained in connection with the cylinder lens $c_2$ in Figs. 2 and 3.

The lenses all being of equal center thickness and the relation of the principal points and the vertices being the same in all of the lenses relatively to the plano surface of the lens, it will be seen that the periphery of the lens and its plano surface provide an excellent criterion for locating the lens. Accordingly I provide the mounting 52 having a peripheral rim 53 adapted to snugly fit in the lens holders or pockets 54 and 64 which are respectively provided for holding the sphero and cylinder lenses in an ordinary trial frame 70. The mounting 52 is further provided with a shouldered recess consisting of a bore 55 of the same diameter as the lenses, provided with the shoulder 56 against which the peripheral portion of the plano surface of the lens is adapted to be held.

I preferably make the bore 55 in all of the mountings of equal depth and compensate for the difference in edge thickness of the lenses, by providing spacing rings 57 of different widths for relatively thin edged lenses as shown in Fig. 5 and, as shown in Fig. 6, by beveling off the relatively thick edged lenses in order to permit of spinning over the metal of the mounting to hold the lenses in place in the mounting.

It will be observed that in the lenses of the set illustrated in Figs. 5 and 6, one vertex and one principal point in each lens is coincident. Thus in the sphero lenses $s_5$ and $s_6$, the vertex such as $V's_5$ or $V's_6$ adjacent the eye E, and the adjacent or rearmost principal point, such as $P's_5$ or $P's_6$ are coincident; and therefore the back focus and equivalent focal length of any of the sphero test lenses, as placed before the eye of a patient, are the same; and also the distance from the apex A of the cornea to the adjacent vertex such as $V's_5$ or $V's_6$ of a lens, is the same as the distance from the apex of the cornea to the adjacent or rearmost principal point of said lens.

Accordingly, when the sight bar 60 of the corneal distance gage is arranged in line with the vertex of the sphero lens placed in the pocket 54 of the trial frame as shown in dotted lines in Figs. 5 and 6, the scale 80 to which the sight bar is attached, coöperating with any suitable index, such as the edge 82 of the scale bar guide 83 carried by the trial frame, will register zero and when the sight bar is brought into alinement with the apex A of the cornea of the eye under examination, as shown in full lines in Figs. 5 and 6 the scale 80, coöperating with the index 82, will register at once the distance from the apex of the cornea to the adjacent vertex and to the adjacent principal point of any sphero lens of the set placed in the trial frame pocket 53.

Having thus described my invention, what I claim and desire to secure by Letters Patent of the United States, is:

1. The combination with a support adapted to be adjusted before the eyes of a patient, of a plurality of lenses of different refractive qualities each having means for engagement with the support whereby said lenses may be interchangeably held in position to test the refraction of either or both of the patient's eyes, the principal points, vertices and support engaging means of each of the lenses being so coördinated that when the lenses are selectively arranged in position before an eye of the patient, the same vertex and the same principal point of each of the lenses may occupy the same position relatively to each other and relatively to the eye.

2. The combination with a support adapted to be adjusted before the eyes of a patient, of a plurality of spherical lenses of different powers and a plurality of cylinder lenses of different powers, each of the lenses having means for engagement with the support whereby they may, singly or in combination, be held in position to test the refraction of either or both of the patient's eyes, the principal points, vertices and support engaging means of each of the lenses being so coördinated that the same vertex and principal point of any of the spherical lenses and the same vertex and principal point of any of the cylinder lenses will occupy the same relative position while being used to test the refraction of an eye.

3. A plurality of test lenses of different dioptric powers adapted to be applied to a support and all having their principal points disposed in the same relation relatively to their geometrical centers, and support engaging means on each of the lenses arranged to hold those applied to the support in the same relative position.

4. The combination with a trial frame having one or more holders for supporting test lenses before an eye to be tested, of a plurality of test lenses having their principal points coördinated by making said lenses all of material of the same refractive index and with equal center thicknesses, and a plurality of mountings, one for each of the lenses, said mounting being so coördinated that the principal points and the vertices of the lenses held thereby will all occupy the same position relatively to the holder in which they are individually placed when testing the refractive properties of an eye.

5. In an apparatus for testing eyes, the combination with a trial frame having a pair of alined test lens holders one for supporting sphero lenses and the other for supporting cylinder lenses before an eye to be tested, of a plurality of sphero test lenses of different dioptric powers having their principal points and their holder engaging means disposed in the same relative positions, and a plurality of cylinder test lenses of different dioptric powers each of said cylinder lenses when placed in its respective holder being adapted to provide a working principal point in the plane common to the rearmost principal point of all of the spherical test lenses when placed in position in their respective holder.

6. In an apparatus for testing eyes, the combination with a lens support and a plurality of lenses of different refractive qualities adapted to be selectively placed before the eyes of a patient and having their principal points, their vertices and their support engaging portions coördinated, of a gage provided with means including a scale and index adapted simultaneously to indicate the distance from a given point to a physical and to an optical point of a lens in the support.

7. The combination with a trial frame having a holder for supporting test lenses individually before an eye to be tested, of a plurality of test lenses of different dioptric powers each having a plano optical surface and a curved optical surface and each provided with a trial frame engaging portion arranged to hold the vertex of the curved surface of each of the lenses in uniform relation to the lens holder, said lenses each being adapted to be placed with the vertex of its curved surface facing the eye to be tested, whereby the distance from the cornea of the eye being tested to the vertex of the test lens in front thereof and the distance from said cornea to the adjacent principal point of said lens will be the same and whereby the lens is adapted to denote the refractional correction in terms of the back focus of the lens.

8. The combination with a trial frame having a test lens holder, a plurality of plano convex and plano concave test lenses of the same center thickness and each having their principal points and their vertices in the same position relatively to the plano surface of the lens, of a plurality of mountings one for each of the lenses, said mountings each having a portion adapted to engage the lens holder and a lens seat adapted to engage with the plano surface of the lens held therein at its periphery, the lens holder engaging portions of all of the mountings being disposed in the same relative position.

GUSTAV A. H. KELLNER.

Copies of this patent may be obtained for five cents each, by addressing the "Commissioner of Patents, Washington, D. C."